(12) United States Patent
Mishra et al.

(10) Patent No.: US 8,161,134 B2
(45) Date of Patent: Apr. 17, 2012

(54) SMART ZONING TO ENFORCE INTEROPERABILITY MATRIX IN A STORAGE AREA NETWORK

(75) Inventors: Chandan Mishra, Sunnyvale, CA (US); Rajeev Bhardwaj, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1362 days.

(21) Appl. No.: 11/231,426

(22) Filed: Sep. 20, 2005

(65) Prior Publication Data

US 2007/0067589 A1    Mar. 22, 2007

(51) Int. Cl.
*G06F 15/177* (2006.01)

(52) U.S. Cl. ........................................ 709/220

(58) Field of Classification Search ............ 709/220
See application file for complete search history.

(56) References Cited

U.S. PATENT DOCUMENTS

| | | | | |
|---|---|---|---|---|
| 5,845,087 A * | 12/1998 | Trehus | ............ | 709/242 |
| 6,182,226 B1 * | 1/2001 | Reid et al. | ............ | 726/15 |
| 6,208,649 B1 * | 3/2001 | Kloth | ............ | 370/392 |
| 6,622,220 B2 * | 9/2003 | Yoshida et al. | ............ | 711/152 |
| 6,765,919 B1 * | 7/2004 | Banks et al. | ............ | 370/401 |
| 6,792,557 B1 * | 9/2004 | Takamoto et al. | ............ | 714/6.32 |
| 7,103,653 B2 * | 9/2006 | Iwatani | ............ | 709/223 |
| 7,107,328 B1 * | 9/2006 | Muthiyan et al. | ............ | 709/220 |
| 7,167,472 B2 * | 1/2007 | Wu et al. | ............ | 370/389 |
| 7,222,173 B2 * | 5/2007 | Goodman | ............ | 709/224 |
| 7,272,661 B2 * | 9/2007 | Sato | ............ | 709/242 |
| 7,340,167 B2 * | 3/2008 | McGlaughlin | ............ | 398/45 |
| 7,346,670 B2 * | 3/2008 | Kitani et al. | ............ | 709/219 |
| 7,386,585 B2 * | 6/2008 | Agrawal et al. | ............ | 709/200 |
| 7,389,312 B2 * | 6/2008 | Ohran | ............ | 1/1 |
| 7,398,421 B1 * | 7/2008 | Limaye et al. | ............ | 714/18 |
| 7,401,338 B1 * | 7/2008 | Bowen et al. | ............ | 719/328 |
| 7,406,039 B2 * | 7/2008 | Cherian et al. | ............ | 370/228 |
| 7,437,445 B1 * | 10/2008 | Roytman et al. | ............ | 709/223 |
| 7,437,753 B2 * | 10/2008 | Nahum | ............ | 726/4 |
| 7,499,988 B2 * | 3/2009 | Keohane et al. | ............ | 709/221 |
| 2002/0053020 A1 * | 5/2002 | Teijido et al. | ............ | 713/153 |
| 2002/0165978 A1 * | 11/2002 | Chui | ............ | 709/238 |
| 2003/0079000 A1 * | 4/2003 | Chamberlain | ............ | 709/220 |
| 2003/0237017 A1 * | 12/2003 | Jibbe | ............ | 714/4 |
| 2004/0006612 A1 * | 1/2004 | Jibbe et al. | ............ | 709/223 |
| 2004/0148380 A1 * | 7/2004 | Meyer et al. | ............ | 709/223 |
| 2004/0205089 A1 | 10/2004 | Alon et al. | ............ | 707/200 |
| 2005/0091353 A1 * | 4/2005 | Gopisetty et al. | ............ | 709/223 |
| 2006/0020912 A1 * | 1/2006 | Illowsky et al. | ............ | 717/103 |

\* cited by examiner

*Primary Examiner* — Wing Chan
*Assistant Examiner* — Alicia Baturay
(74) *Attorney, Agent, or Firm* — Weaver Austin Villeneuve & Sampson LLP

(57) ABSTRACT

The present invention describes various mechanisms which may be used for improving SAN device interoperability enforcement techniques implemented in SAN or Fiber Channel networks. In one implementation, the technique of the present invention allows a SAN to automatically enforce interoperability requirements between devices connected to a SAN by utilizing SAN zoning technology to implement one or more novel types of "smart" zones having different, customizable attributes. In one implementation, a first device and second device of the SAN may be automatically identified as being non-interoperable. The first device and the second device may then be included as members of a negative zone having a first associated negative zone attribute prohibiting communication between members of the first negative zone.

33 Claims, 11 Drawing Sheets

| | Zone ID (702) | Members (704) | Attributes (706) |
|---|---|---|---|
| 701 → | A | WWN1, WWN4 | Negative |
| 703 → | B | WWN2, WWN3, WWN6 | Negative |
| 705 → | C | WWN4, WWN5, WWN6 | Read-Only |
| 707 → | D | WWN1, WWN2, WWN6 | Read/Write |
| | ⋮ | ⋮ | ⋮ |

↖—700

|  Device 2<br>Device 1 | EMC Disk (WWN2) | HP Disk (WWN4) | HDS (WWN6) |
|---|---|---|---|
| Sun/Solaris Server (WWN1) | Read-Write | None | Read-Write |
| HP Server (WWN3) | None | Read-Write | None |
| Windows Server (WWN5) | Read-Write | Read | Read |
| ⋮ | ⋮ | ⋮ | ⋮ |

Fig. 6

| Zone ID | Members | Attributes |
|---|---|---|
| A | WWN1, WWN4 | Negative |
| B | WWN2, WWN3, WWN6 | Negative |
| C | WWN4, WWN5, WWN6 | Read-Only |
| D | WWN1, WWN2, WWN6 | Read/Write |
| ⋮ | ⋮ | ⋮ |

Fig. 7

SMART ZONING TO ENFORCE INTEROPERABILITY MATRIX IN A STORAGE AREA NETWORK

BACKGROUND OF THE INVENTION

1. Field of the Invention

The present invention relates to storage area networks, and more particularly to mechanisms for enforcing interoperability matrix parameters in a storage area network.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the following publications: ANSI INCITS 373-2003, Fibre Channel Framing and Signaling Interface (FC-FS); ANSI INCITS 384-2004, Fibre Channel-Switch Fabric-3 (FC-SW-3); and ANSI INCITS 387-2004, Fibre Channel-Generic Services-4 (FC-GS-4); all of which are incorporated herein by reference for all purposes.

In conventional Fibre Channel, each device (e.g., hosts, storage devices and switches) is identified by an unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel Port of each end device (hosts and storage devices) is addressed via a three (3) byte Fibre Channel address (or FCID), allocated dynamically to the end devices by the fabric. A unique FCID is assigned to a host device or disk device when the device logs in to the fabric. Additionally, each switch in the fabric is assigned a specific domain by the domain manager when the switch is connected to the fabric. All the devices connected to a given switch will have the DomainID of the switch as the first byte of their FCIDs. This "Domain" value is used for routing the frames within the fabric. Each FC frame header will include a Source Identifier (SID) field representing the source FCID, and a Destination Identifier (DID) field representing the destination FCID.

Interoperability between different SAN devices is an important consideration when configuring a SAN network. Even though many SAN protocols are standardized, it is common for different vendors to use different standardized SAN protocols for their SAN device implementations. As a result, many SAN devices from different vendors are not compatible with each other. Additionally, it is also possible for SAN devices from the same vendor to be incompatible with each other, for example, if the SAN devices have different firmware versions. Additional compatibility issues between SAN devices may also arise, for example, due to differences in host bus adaptor (HBA) firmware implementations and/or differences in operating system implementations. In some cases, interoperability issues between SAN devices have resulted in SAN availability being compromised and/or loss of data.

Currently, enforcement of SAN device interoperability is typically performed by the customer or administrator via manual configuration technique. That is, the customer/administrator is required to manually configure the SAN in a manner so as to prevent incompatible devices from talking to each other. Additionally, the customer/administrator must also keep track of new/updated interoperability information (such as, for example, new firmware releases, new types of hardware, etc.), and manually update the SAN configuration parameters in response to such information in order to maintain effective enforcement of SAN device interoperability. Not surprisingly, such manual interoperability enforcement techniques are extremely susceptible to human error.

Accordingly, it will be appreciated that there exists a need for improving SAN device interoperability enforcement techniques implemented in SAN or Fibre Channel networks.

SUMMARY OF THE INVENTION

Various aspects of the present invention are directed to different methods, systems, and computer program products for facilitating enforcement of device interoperability requirements in a storage area network (SAN) which includes a fibre channel fabric comprising at least one switch. A first frame is received at a device such as, for example, a switch. In one embodiment, the first frame includes header information specifying a source device identity relating to a source device and a destination device identity relating to a destination device. A determination is made whether the source device and destination device are members of a first negative zone. According to a specific embodiment, the first negative zone corresponds to a SAN-implemented zone having a first associated negative zone attribute prohibiting communication between members of the first negative zone. The first frame may be prevented from reaching the destination device in response to a determination that the source device and destination device are members of the first negative zone. In one implementation, a first portion of device interoperability information relating to the source device and destination device may be analyzed to determine whether the source device and destination device are non-interoperable. If it is determined that the source device and destination device are non-interoperable, the source device and the destination device may be included as members of the first negative zone.

Other aspects of the present invention are directed to different methods, systems, and computer program products for facilitating enforcement of device interoperability requirements in a storage area network (SAN) which includes a fibre channel fabric comprising at least one switch. A first request is received from a first SAN device. In one implementation, the first request includes a lookup request or a connection request for identifying other devices connected to the SAN. A first portion of device interoperability information relating to the first SAN device may be accessed. Using the first portion of device interoperability information, at least one non-interoperable device connected to the SAN may be identified as being non-interoperable with the first SAN device. A first response to the first request may be generated, wherein the first response does not include information relating to an identity of the at least one non-interoperable device. Additionally, in one implementation, using the first portion of device interoperability information, at least one interoperable device connected to the SAN may be identified as being interoperable with the first SAN device. The first response to the first request may be generated, wherein the first response includes information relating to the identity of the at least one non-interoperable device.

Additional aspects of the present invention are directed to different methods, systems, and computer program products for facilitating enforcement of device interoperability requirements in a storage area network (SAN) which includes a fibre channel fabric comprising at least one switch. A first portion of device interoperability information relating to the SAN may be analyzed. Using the first portion of device interoperability information, a first device and second device of the SAN may be automatically identified as being non-interoperable. The first device and the second device may then be included as members of a first negative zone. In one implementation, the first negative zone may correspond to a SAN-implemented zone having a first associated negative zone attribute prohibiting communication between members of the first negative zone.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 6 shows an example of a portion of an Interoperability Matrix Table 600 in accordance with a specific embodiment of the present invention.

FIG. 7 shows a representation of a portion of a Zone Attribute Table 700 which may be used for implementing aspects of the interoperability enforcement techniques of the present invention.

DETAILED DESCRIPTION OF THE PREFERRED EMBODIMENTS

The present invention describes various mechanisms which may be used for improving SAN device interoperability enforcement techniques implemented in SAN or Fibre Channel networks.

Figure 1:
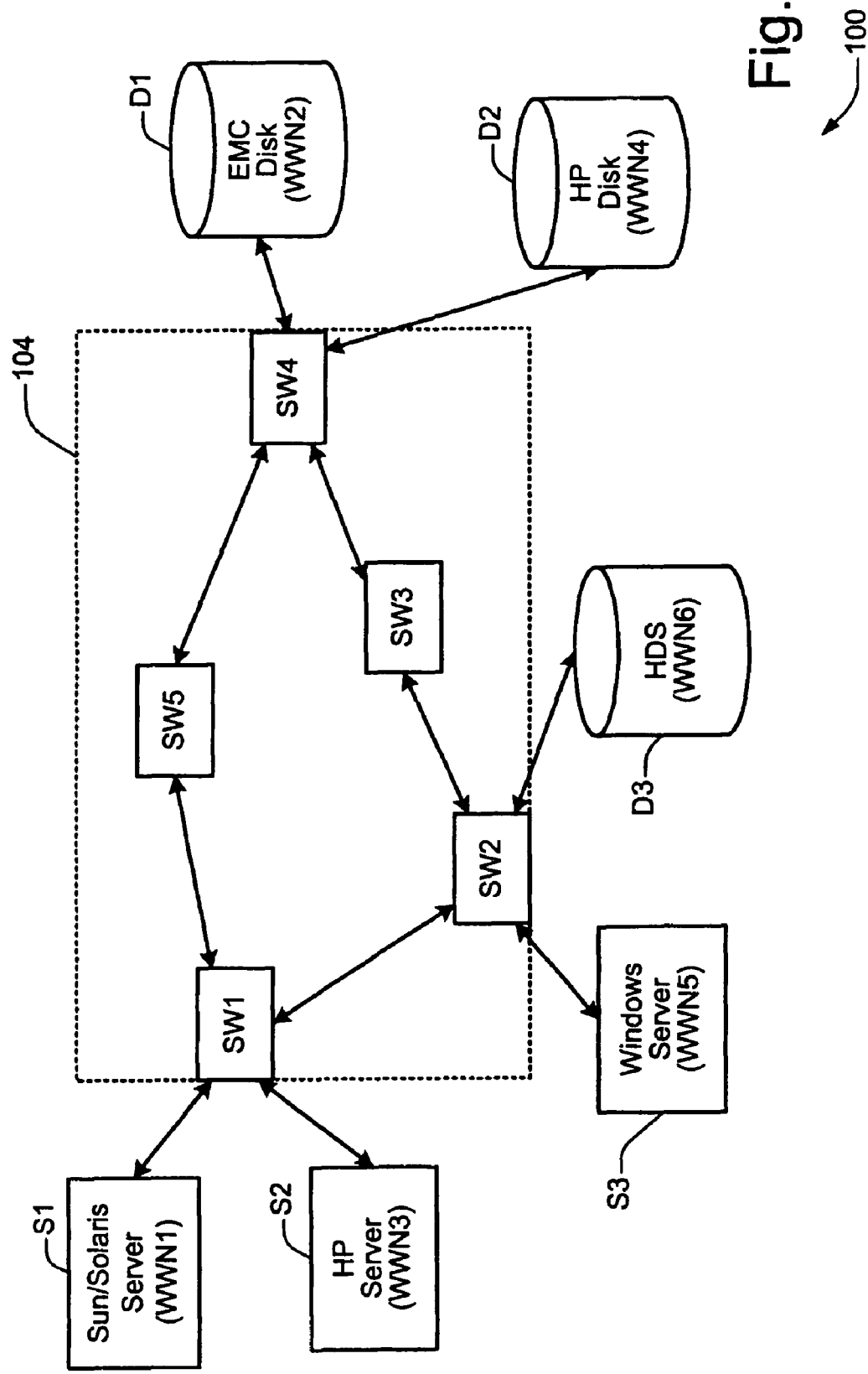
FIG. 1 shows a block diagram of a portion 100 of a Fibre Channel network which may be used for demonstrating various aspects of the present invention.

FIG. 1 shows a block diagram of a portion 100 of a Fibre Channel network. As illustrated in the example of FIG. 1, the Fibre Channel network includes a plurality of hosts or servers (e.g., S1, S2, S3), a plurality of discs or storage devices (e.g., D1, D2, D3), and a Virtual Storage Area Network (VSAN) fabric 104 which includes a plurality of switches (e.g., SW1-SW5) such as, for example, switches from the MDS line of storage switches available from Cisco Systems of San Jose, Calif. As illustrated in FIG. 1, each of the SAN devices may be uniquely identified using a unique world wide name ID (WWN-ID).

A flow between any two Fibre Channel (FC) devices may be characterized by the respective identities (e.g., FCIDs) of each device. For example, the flow S1-D1 may correspond to an exchange of frames between server S1 and storage device D1. Typically, in FC networks, a given flow is expressed in terms of the SID and DID parameters (e.g., SID-DID) associated with the frames of that flow.

According to a specific embodiment, each flow in the Fibre Channel network includes at least one exchange of one or more sequences of frames transmitted from one port to another. Each Fibre Channel sequence may represent a series of one or more related frames transmitted unidirectionally from one port to another. A Fibre Channel exchange represents a series or one or more nonconcurrent sequences between two ports. The sequences may be in either direction. As another perspective, one can use the following analogy to characterize the hierarchy of frames, sequences, and exchanges in a Fibre Channel network: frames correspond to words, sequences correspond to sentences, and exchanges correspond to conversations. Thus, for example, a Fibre Channel (FC) device may be configured or designed to "speak" more than one sentence and hold more than one "conversation" at a time with another FC device.

Traditionally, Fibre Channel based SANs are often organized into zones. Within each zone, hosts or servers can see and access only storage devices or other hosts/servers belonging to that zone. This allows the coexistence on the same SAN of different computing environments. Additionally, zoning allows the partition of a Fibre Channel fabric into smaller fabrics to allow the implementation of features such as security and restrictions. Devices belonging to a single functional group are typically placed under the same zone. For example, devices involved in online transactions can be placed in one zone while devices associated with backing up user data can be placed in another zone. The SAN administrator may define in a SAN multiple zones, as required or dictated by the computing and storage resources connected to it. The Switching Fabric allows communications only between devices belonging to the same zone, preventing a device of one zone from seeing or accessing a device of another zone.

Recently, new technology referred to as Virtual Storage Area Networks (VSANs) have been implemented in order to enhance fabric scalability and availability, and further augment the security services offered by fabric zoning. VSANs combined with hardware-enforced zoning provide the SAN designer with new tools to highly optimize SAN deployments in terms of scalability, availability, security and management. VSANs provide the ability to create completely isolated fabric topologies, each with its own set of fabric services, on top of a scalable common physical infrastructure. As each VSAN possesses its own zoning service, zoning is then configured within each VSAN independently and has no affect on any other VSAN and zoning service.

Zoning and/or VSAN technology may also be used for enforcement of SAN device interoperability. For example, a customer or administrator may manually configure one or more VSANs such that no two incompatible devices are placed in the same VSAN. Alternatively, the customer or administrator may manually configure one or more zones of a VSAN such that no two incompatible devices are placed in the same zone. However, such manual interoperability enforcement techniques are labor intensive, and frequently require manual re-configuring of the SAN configuration (e.g., zoning/VSAN configurations) in response to new/updated interoperability information. Not surprisingly, such manual interoperability enforcement techniques are extremely susceptible to human error.

In accordance with various embodiments of the present invention, one technique for implementing SAN device interoperability enforcement is to utilize SAN zoning technology to implement one or more novel types of "smart" zones having different, customizable attributes. For example, different types of smart zones may include: "negative smart zones", "read-only smart zones", "read-write smart zones", "write-only smart zones", "one-way read-only smart zones", "one-way write-only smart zones", "one-way read-write smart zones", etc. As described in greater detail below, each of these different types of smart zones may be used to define different attributes for facilitating SAN device interoperability enforcement.

For example, in at least one implementation, a "negative smart zone" may be used to prohibit both read operations and write operations between SAN devices which are members of the same negative smart zone. Thus, for example, referring to FIG. 1, if it is desired to prevent server S1 and storage device D1 from speaking to each other (e.g., due to incompatibility issues), a negative smart zone may be created and populated with members S1 and D1. The attributes of the negative smart zone may specify that both read operations and write operations are prohibited between its members. In this way, the negative smart zone may be used for implementing SAN device interoperability enforcement by prohibiting both read and write operations between S1 and D1. It will be appreciated that, in other embodiments, a negative smart zone may include any desired number of members. Additionally, multiple negative smart zones may be created and utilized within a SAN for implementing more granular SAN device interoperability enforcement. In at least one implementation, implementation of a negative smart zone may be achieved by defining a new type of zone attribute which, for example, may be referred to as a "negative" zone attribute. In one embodiment, the "negative" zone attribute may be expressed using one or more alpha-numeric characters. Using conventional zoning techniques such as those defined, for example, in the FC-SW-3 and/or FC-GS-4 standards, the "negative" zone attribute may be included in the zone attribute field of a conventional SAN zone entry to thereby create a negative smart zone having the negative smart zone attributes as described above.

A "read-only smart zone" may be used to allow only read operations between SAN devices which are members of the same read-only smart zone. Thus, for example, referring to FIG. 1, if server S1 is allowed to read data from storage device D1, but not allowed to write data to storage device D1, a read-only smart zone may be created and populated with members S1 and D1. The attributes of the read-only smart zone may specify that only read operations may be performed between its members. In this way, the read-only smart zone may be used for implementing SAN device interoperability enforcement by allowing read-only operations between S1 and D1. It will be appreciated that, in other embodiments, a read-only smart zone may include any desired number of members. Additionally, multiple read-only smart zones may be created and utilized within a SAN for implementing more granular SAN device interoperability enforcement.

Similar to the "read-only smart zone", a "one-way read-only smart zone" may be used to allow only unidirectional read operations between specified SAN devices. Thus, for example, referring to FIG. 1, if server S1 is allowed to read data from server S2, but not vice-versa, a one-way read-only smart zone may be created and populated with members S2 and S1. The attributes of the one-way read-only smart zone may specify that S1 is allowed to read data from server S2, but not vice-versa. It will be appreciated that, in other embodiments, a one-way read-only smart zone may include any desired number of members. Additionally, multiple one-way read-only smart zones may be created and utilized within a SAN for implementing more granular SAN device interoperability enforcement.

A "write-only smart zone" may be used to allow only write operations between SAN devices which are members of the same write-only smart zone. Thus, for example, referring to FIG. 1, if server S1 is allowed to write data to storage device D1, but not allowed to read data from storage device D1, a write-only smart zone may be created and populated with members S1 and D1. The attributes of the write-only smart zone may specify that only write operations may be performed between its members. In this way, the write-only smart zone may be used for implementing SAN device interoperability enforcement by allowing write-only operations between S1 and D1. It will be appreciated that, in other embodiments, a write-only smart zone may include any desired number of members. Additionally, multiple write-only smart zones may be created and utilized for implementing more granular SAN device interoperability enforcement.

Similar to the "write-only smart zone", a "one-way write-only smart zone" may be used to allow only unidirectional write operations between specified SAN devices. Thus, for example, referring to FIG. 1, if server S2 is allowed to write data to server S1, but not vice-versa, a one-way write-only smart zone may be created and populated with members S1 and S2. The attributes of the one-way write-only smart zone may specify that S2 is allowed to write data to server S1, but not vice-versa. It will be appreciated that, in other embodiments, a one-way write-only smart zone may include any desired number of members. Additionally, multiple one-way write-only smart zones may be created and utilized within a SAN for implementing more granular SAN device interoperability enforcement.

A "read-write smart zone" may be used to allow both read operations and write operations between SAN devices which are members of the same read-write smart zone. Thus, in one implementation, the attributes of this type of zone is similar to that of conventional SAN zones. For example, referring to FIG. 1, if it is desired to allow server S1 and storage device D1 to speaking to each other, a read-write smart zone may be created and populated with members S1 and D1. The attributes of the read-write smart zone may specify that both read operations and write operations are allowed between its members. In this way, the read-write smart zone may be used for implementing SAN device interoperability enforcement by allowing both read and write operations between S1 and D1. It will be appreciated that, in other embodiments, a read-write smart zone may include any desired number of members. Additionally, multiple read-write smart zones may be created and utilized within a SAN for implementing more granular SAN device interoperability enforcement.

Similar to the "read-write smart zone", a "one-way read-write smart zone" may be used to allow only unidirectional read-write operations between specified SAN devices. Thus, for example, referring to FIG. 1, if Server S1 is allowed to perform read-write operations at Server S2, but not vice-versa, a one-way read-write smart zone may be created and populated with members S1 and S2. The attributes of the one-way read-write smart zone may specify that S1 is allowed to perform read-write operations at S2, but not vice-versa. It will be appreciated that, in other embodiments, a one-way read-write smart zone may include any desired number of members. Additionally, multiple one-way read-write smart zones may be created and utilized within a SAN for implementing more granular SAN device interoperability enforcement.

According to at least one implementation, any conflict in smart zone interoperability enforcement may be resolved by resorting to the least common denominator of the conflicting interoperability enforcement restrictions. For example, if two members belong to a read-only smart zone and also belong to a read-write smart zone, the read-only smart zone will have priority, and write access between the two members will be denied. Similarly, if two members belong to a negative smart zone and also to a read-write smart zone, negative smart zone will have priority, and communication between two members will be prohibited. According to a specific embodiment, the order of priority between different types of smart zones may be set as follows (in order of relatively highest priority): negative smart zones, one-way read-only smart zones, one-way write-only smart zones, read-only smart zones, one-way read-write smart zones, read-write smart zones.

According to different embodiments of the present invention, configuration of different smart zones within a given SAN may be implemented using manual techniques and/or automated techniques. As described in greater detail below, one preferred implementation of the present invention utilizes an automated technique for configuring and/or reconfiguring desired smart zones within a given SAN.

In one embodiment, the automated technique for configuring and/or reconfiguring desired smart zones within a given SAN may be implemented using interoperability information relating to one or more SAN devices. Such interoperability information may be acquired from a variety of sources such as, for example: information provided by vendors of the various SAN devices/components (e.g.; information bundled with SAN software. For example, updated interoperability information may be periodically downloaded from one or more online sources such as, for example, vendor websites. Additionally new or updated interoperability matrix information may be sent to customers through field notices (e.g., one or more binary files can be provided to customers and subsequently download to one or more switches).

It will be appreciated that, in conventional SAN implementations, there is typically no single or centralized source for obtaining interoperability information relating to each of the SAN devices in a given SAN. Consequently, a customer or administrator is typically required to manually obtain all relevant SAN device interoperability information from multiple sources, and then use such information to manually implement interoperability enforcement configurations in the SAN. Additionally, because the interoperability enforcement configurations of the SAN are manually implemented, there is no incentive in conventional SANs for distributing the interoperability information to the SAN devices since, for example, there is no mechanism in conventional SANs for providing automatic configuration or reconfiguration of the zones/VSANs used for implementing SAN device interoperability enforcement.

In contrast to conventional SAN techniques, one aspect of the present invention is directed to a technique for aggregating SAN device interoperability information, and using such information to populate an Interoperability Matrix Table or other data structure which includes at least a portion of the aggregated SAN device interoperability information.

FIG. 6 shows an example of a portion of an Interoperability Matrix Table 600 in accordance with a specific embodiment of the present invention. As shown in the example of FIG. 6, the Interoperability Matrix Table 600 provides interoperability information relating to different pairs of SAN devices. More specifically, the portion of the Interoperability Matrix Table shown in FIG. 6 provides an example of interoperability information relating to different pairs of Server-Storage devices of the SAN portion 100 of FIG. 1. Thus, for example, as illustrated in the example of FIG. 6, Server WWN1 is allowed to perform both read and write operations at Storage Devices WWN2 and WWN6. However, Server WWN1 is not permitted to communicate with Storage Device WWN4. Additionally, as illustrated in the example of FIG. 6, Server WWN5 is allowed to perform read-only operations at Storage Devices WWN4 and WWN6.

It will be appreciated that the interoperability information included in the Interoperability Matrix Table 600 of FIG. 6 illustrates only a portion of the interoperability information which may be included in the Interoperability Matrix Table. Moreover, the interoperability information included in the Interoperability Matrix Table 600 of FIG. 6 is merely illustrative of some of the different types of information which may be included in such a table. Different embodiments of the Interoperability Matrix Table (not shown) may include additional and/or other interoperability information not illustrated in FIG. 6. For example, the Interoperability Matrix Table of FIG. 6 illustrates a 2-dimensional data structure for relating interoperability information between two different types of SAN devices, namely SAN servers and SAN storage devices. However, in at least one implementation, an Interoperability Matrix data structure may be implemented as a multi-dimensional (e.g., 2-dimensional, 3-dimensional, 4-dimensional, etc.) data structure for relating interoperability information between multiple types of SAN devices such as, for example: hosts, servers, switches, storage devices, host bus adapters (HBAs), etc. Additionally, in at least one implementation, the Interoperability Matrix data structure may also include interoperability information relating to SAN devices which are not currently implemented or deployed in the SAN, but which may be implemented or deployed in the SAN at a future time.

In at least one implementation, one or more SAN devices of a given SAN may be configured or designed to store a respective copy of the Interoperability Matrix Table in local memory. For example, in one implementation, a respective copy of the Interoperability Matrix Table may be stored in local memory at each switch in the FC fabric.

A variety of different techniques may be used for populating and/or updating the interoperability information stored in the Interoperability Matrix Table. For example, portions of the Interoperability Matrix Table may be manually populated/updated (e.g., by an administrator). Other portions of the Interoperability Matrix Table may be automatically populated/updated, for example, using interoperability information obtained from another SAN device and/or an external source such as, for example, a remote server. For example, one or more devices (e.g., SAN devices) may be configured or designed to periodically poll one or more remote servers for SAN device interoperability information updates. In one implementation, the interoperability information updates may be included in one or more binary files which are able to be downloaded by the customer. When updated interoperability information is received, the device(s) may update their respective Interoperability Matrix Table using the received information, and distribute the updated Interoperability Matrix Table to other SAN devices in the SAN using a SAN information distribution protocol such as, for example, Cisco's CFS (Cisco Fabric Services) protocol.

In a different implementation, the device(s) receiving the updated interoperability information from the remote server(s) may distribute the received updated interoperability information to other SAN devices (e.g., switches), and allow the other SAN devices to update their respective Interoperability Matrix Tables using the updated interoperability information. In yet another embodiment, each SAN device which maintains a local copy of the Interoperability Matrix Table may be configured or designed to periodically poll one or more devices (e.g., remote servers) for SAN device interoperability information updates, and use received interoperability information updates to update their respective Interoperability Matrix Tables. This latter embodiment may be particularly useful in SAN implementations which do not include a SAN information distribution protocol capable of distributing updated interoperability information to other SAN devices.

According to different embodiments, a least a portion of the switches (and/or other devices) of the SAN may be configured or designed to not maintain a local copy of the Interoperability Matrix Table information. For example, in one implementation, a selected switch or other SAN device may be configured or designed to populate, update and/or manage information to be stored in a local Interoperability Matrix Table. The Interoperability Matrix Table information may then be used to generate appropriate smart zone information, which may then be distributed to other SAN devices in the SAN. For example, in one embodiment, the smart zone information may be distributed to each switch in the FC fabric. The switches receiving the smart zone information may then merge the received smart zone information with existing zoning information stored in local zoning tables. Such switches may then the use the locally stored Smart zone information to implement appropriate interoperability enforcement, as described, for example, in greater detail below.

Figure 2:
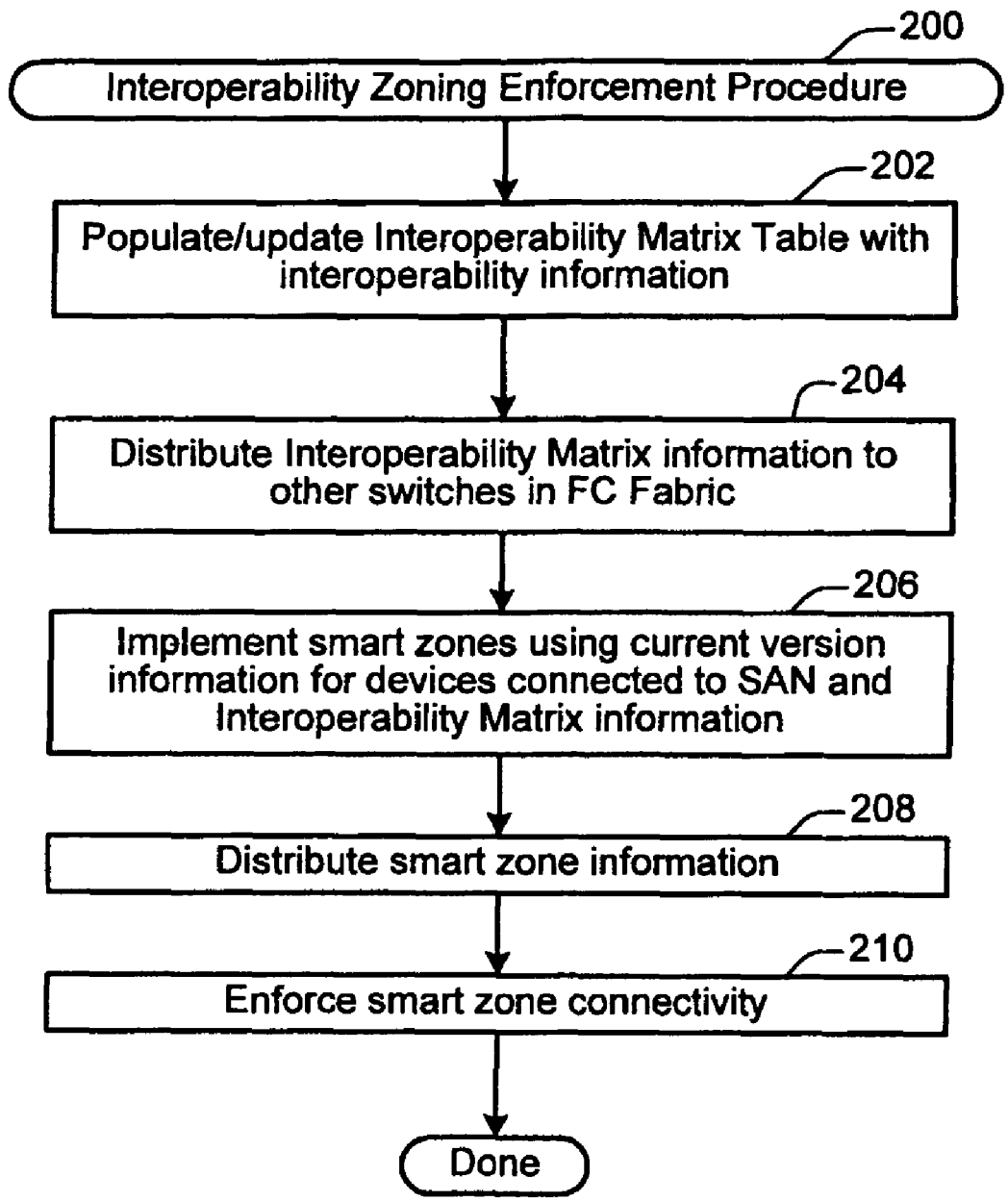
FIG. 2 shows a flow diagram of an Interoperability Zoning Enforcement Procedure 200 in accordance with a specific embodiment of the present invention.

FIG. 2 shows a flow diagram of an Interoperability Zoning Enforcement Procedure 200 in accordance with a specific embodiment of the present invention. In at least one implementation, a separate instance of the Interoperability Zoning Enforcement Procedure (or portions thereof) may be implemented at selected SAN devices. For example, in embodiments where SAN device interoperability enforcement is implemented at the FC fabric, a separate instance of the Interoperability Zoning Enforcement Procedure (or portions thereof) may be implemented at selected switches in the FC fabric such as, for example, edge switches and/or fabric switches.

As shown at 202 of FIG. 2, at least one Interoperability Matrix Table may be populated and/or updated using SAN device interoperability information. According to different embodiments, the interoperability information may be acquired using a variety of different techniques such as those described previously. In specific embodiments where individual SAN devices (such as, for example, edge switches and/or fabric switches) are responsible for maintaining and updating a respective local copy of the Interoperability Matrix Table, portions of the Interoperability Matrix information may be optionally distributed (204) to such SAN devices. For example, in one implementation, interoperability Matrix information may be loaded on one switch and then distributed to all other switches in the fabric using a SAN information distribution protocol such as, for example, Cisco's CFS (Cisco Fabric Services) protocol. In at least one implementation, the Interoperability Matrix information may be refreshed or updated on a periodic basis to accommodate new versions of firmware, software, devices and/or other components of the SAN.

Using the Interoperability Matrix information, one or more smart zones may be configured (206) with appropriate attributes and populated with appropriate members. This process is described in greater detail with regard to FIG. 3 of the drawings.

According to a specific embodiments, other types of information and/or characteristics relating to the SAN devices may also be used to configure and/or populate one or more smart zones in the SAN. For example, in one implementation, current version information relating to one or more devices connected to the SAN may be used in conjunction with the Interoperability Matrix information to determine the appropriate interoperability enforcement characteristics and/or appropriate smart zone attributes relating to each of the combinations of SAN devices currently connected to the SAN. In one implementation, a separate smart zone (having appropriate interoperability enforcement attributes) may be configured and implemented for each combination (or selected combinations) of SAN devices currently connected to the SAN. Additionally, if desired, multiple smart zones having similar attributes, properties and/or members may be consolidated or aggregated into one or more unified smart zones.

According to at least one embodiment, the version information and/or other information relating to the properties of each SAN device may be collected and/or distributed using a SAN information distribution protocol such as, for example, Cisco's CFS (Cisco Fabric Services) protocol, or the Fabric-Device Management Interface (FDMI) protocol. For example, the FDMI protocol may be used to collect information about device targets such as hosts, disks, switches, etc. Examples of the various types of device information which may be collected and distributed using the FDMI protocol include: Device-ID, Node Name, Manufacturer, Device Serial Number, Model Number, Model Description, Hardware Version, Driver Version, ROM Version, Firmware Version, OS Name/Version, CT Payload Length, Port-ID, etc. Information about specific SAN devices may also be manually configured into the FDMI database. Additionally, the information in the FDMI database may be distributed across all switches in the FC fabric. Thus, for example, in one embodiment, an administrator may program target device information in the FDMI database of a selected switch, and use FDMI to distribute the FDMI database information to the rest of the switches in the fabric. Switches receiving the distributed FDMI information may then use the received information to update its local FDMI database.

As illustrated at 208 of FIG. 2, at least a portion of the smart zone information (which, for example, may include smart zone attribute and membership information) may be distributed to other SAN devices in the SAN. For example, in one implementation, the smart zone information may be distributed to each switch in the FC fabric. The switches receiving the smart zone information may then merge the received smart zone information with existing zoning information stored in local zoning tables. In this way, the smart zone information may be synchronized across all switches in the FC, thereby enabling all switches to implement uniformly consistent interoperability enforcement across the SAN. According to a specific embodiment, the smart zone information may be automatically distributed and merged with local zoning information via the use of existing zone distribution mechanisms such as those defined, for example, in the FC-GS-4 and FC-SW-3 standards referenced previously.

According to a specific embodiment, each switch (or selected switches such as, for example, edge switches) may be configured or designed to use the smart zone information to enforce (210) smart zone connectivity among the various SAN devices. In this way, each switch is able to locally enforce SAN device interoperability restrictions. Additionally, such a technique also provides a secondary check mechanism to catch any manual configuration errors, for example.

In at least one implementation, each switch may maintain one or more local data structures relating to the various smart zone configurations (and related attributes) currently implemented in the SAN. This may include, for example, information about any negative smart zones currently implemented. The locally maintained smart zone information may be automatically and dynamically updated (e.g., at periodic intervals) by switch software. In at least one embodiment, the smart zones may be included as part of the active zone set of the SAN. Additionally, any update relating to any of the smart zones may reactivate the current active zone set.

Figure 3:
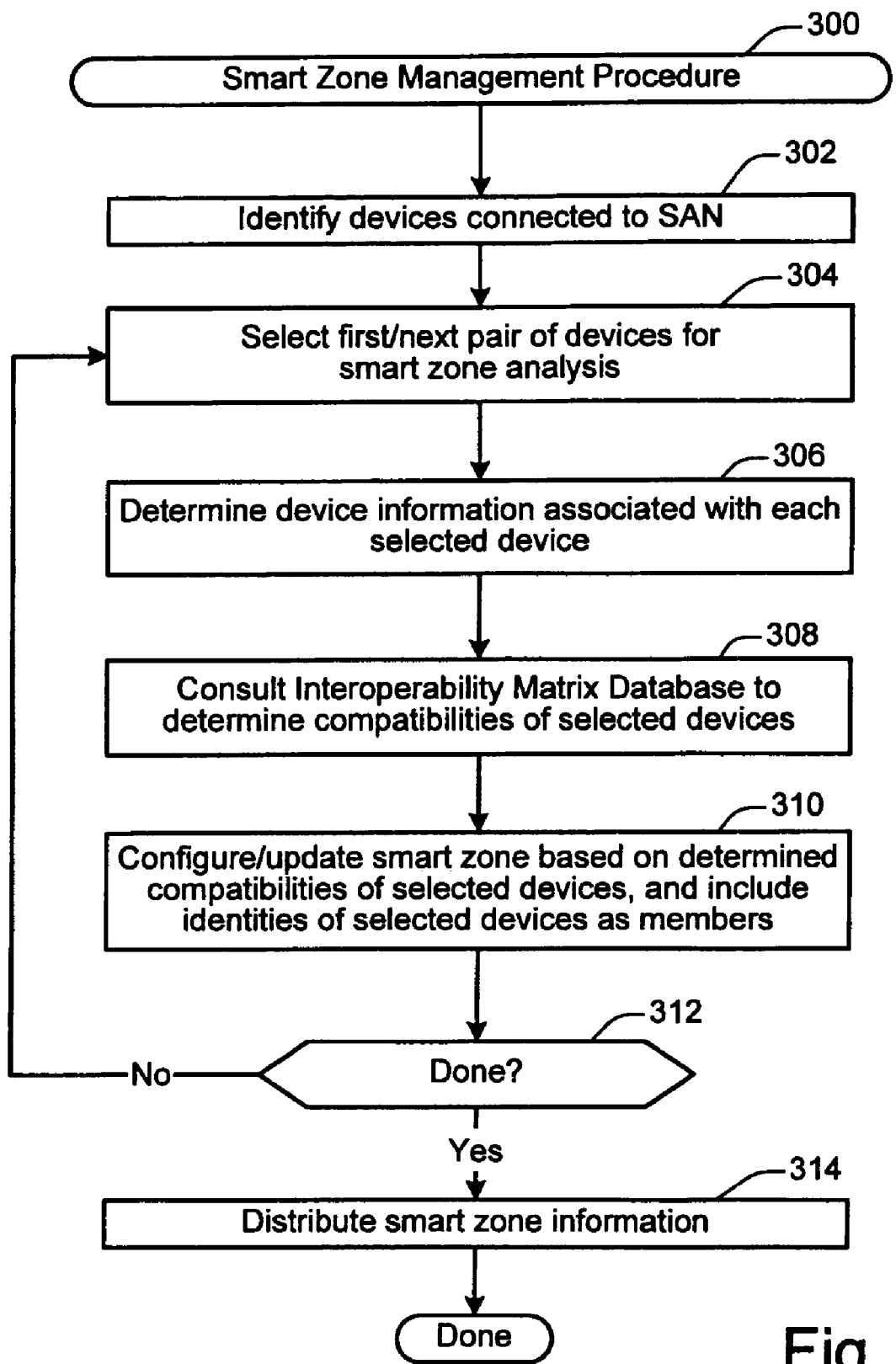
FIG. 3 shows a flow diagram of a Smart Zone Management Procedure 300 in accordance with a specific embodiment of the present invention.

FIG. 3 shows a flow diagram of a Smart Zone Management Procedure 300 in accordance with a specific embodiment of the present invention. In at least one implementation, a separate instance of the Smart Zone Management Procedure (or portions thereof) may be implemented at selected SAN devices such as, for example, at least one switch in the FC fabric. For example, in one implementation, the Smart Zone Management Procedure 300 may be implemented at a selected switch (or multiple selected switches) in the fabric, and the resulting smart zone information generated therefrom may be distributed to other switches in the fabric.

A variety of different events may trigger implementation of the Smart Zone Management Procedure 300 of the present invention. Such events may include, for example: SAN initialization; detection of events relating to SAN reconfiguration; detection of events relating to changes in the SAN configuration (e.g., new SAN devices coming connecting to the fabric); detection of events relating to current SAN devices going offline; detection of events relating to new or updated SAN device information (e.g., updated FDMI information); detection of events relating to new or updated interoperability information; detection of events relating to manual updates of the FDMI database(s); etc. For example, according to a specific embodiment, each time a switch receives an FDMI update, the switch may recalculate the smart zone information, and if any changes are detected, the active-zone-set may be reactivated. As a result, the Smart Zone Management Procedure may be initiated with each FDMI update.

Initially, as shown at 302, each of the devices connected to the SAN are identified. According to a specific embodiment, identification of the currently connected SAN devices may be accomplished using information stored in a local FDMI database. For example, when a host connects to the fabric, it's associated HBA may register relevant device information relating to the host using the FDMI protocol. Such device information may include, for example: Host-ID, Node Name, Manufacturer, Serial Number, Model Number, Model Description, Hardware Version, Driver Version, ROM Version, Firmware Version, OS Name/Version, Port-ID, etc., and/or any combination thereof. This host related information may then be distributed to switches in the fabric for use in updating locally maintained FDMI databases at each switch. For end devices which do not support FDMI, the FDMI database(s) at one or more switches may be manually programmed with the relevant device information, whereupon the FDMI database information may then be distributed to other switches in the fabric for use in updating locally maintained FDMI databases at each switch.

Assuming that the currently connected SAN devices have been identified, a first pair of SAN devices are selected (304) for smart zone analysis. In performing the smart zone analysis, device information relating to each of the selected devices may be determined (306). For example, in one implementation, the device-related information may be determined using information stored in a local and/or remote FDMI database.

Once determined, the device-related information may be used to determine (308) device compatibility criteria relating to the selected devices. According to a specific embodiment, the device compatibility criteria may be determined using Interoperability Matrix information stored in at least one local and/or remote Interoperability Matrix data structure. For example, referring to the Interoperability Matrix Table of FIG. 6, if it is assumed (for the purposes of illustration) that the pair of SAN devices selected for analysis are the Solaris Server (WWN1) and HP Disk (WWN4), the Interoperability Matrix Table information relating to this selected pair of SAN devices indicates that the devices are incompatible (e.g., "none"), meaning that they should not be permitted to speak to each other. If, however, it is assumed that the pair of SAN devices selected for analysis are the Windows Server (WWN5) and HP Disk (WWN4), the Interoperability Matrix Table information relating to this selected pair of SAN devices indicates that read-only operations may be permitted between the two devices.

Returning to FIG. 3, using the determined device compatibility criteria for the selected pair of SAN devices, a specific smart zone type and associated attributes may then be configure/updated (310) for the selected pair of SAN devices, and the smart zone populated with the identities of selected devices as members. For example, if it is assumed that the pair of SAN devices selected for analysis are the Solaris Server (WWN1) and HP Disk (WWN4), the Interoperability Matrix Table information relating to this selected pair of SAN devices indicates that the devices are incompatible. Thus, in at least one implementation, the smart zone type which may be selected and configured for this specific pair of SAN devices is the negative smart zone. Accordingly, a new, negative smart zone may be configured and implemented, for example, by creating a new "negative" smart zone entry in a zone-related data structure such as, for example, a local Smart Zone Attribute Table.

FIG. 7 shows a representation of a portion of a Zone Attribute Table 700 which may be used for implementing aspects of the interoperability enforcement techniques of the present invention. In at least one embodiment, a separate instance of the Zone Attribute Table illustrated in FIG. 7 may reside in memory (such as, for example, the local memory) of one or more switches of the Fibre Channel fabric. As illustrated in the example of FIG. 7, Zone Attribute Table 700 includes a plurality of entries (e.g., 701, 703, 705, 707, etc.). Each entry in the table includes information relating to a variety of different parameters such as, for example, smart zone ID information 702, smart zone member information 704, smart zone attribute information 706, etc. For example, entry 701 includes parameters and/or other information relating to smart zone A such as, for example: the identities of the SAN devices which are members of smart zone A (e.g., WWN1, WWN4); attribute information associated with smart zone A (e.g., "negative" smart zone attributes), etc. In a specific implementation, the attribute information 706 may include other Zone Attribute Objects (e.g., Protocol, Broadcast Zone, Hard Zone, Vendor Specified, QoS, etc.) as defined, for example, in FC-GS-4 and FC-SW-3.

According to one embodiment, one or more smart zones may be implemented by modifying conventional SAN zoning technology to recognize new "smart zone" attribute definitions which, for example, may be included in the zone attribute field of a conventional SAN zone entry. For example, a "negative" zone attribute may be included in the zone attribute field of a conventional SAN zone entry to thereby define a negative smart zone having negative smart zone attributes such as those described previously. In this way, conventional SAN zoning technology may be modified and leveraged for implementing automated interoperability enforcement mechanisms. Additionally, according to specific embodiment, the zone attribute field associated with a given zone may be used to specify the specific attributes of that zone such as, for example, whether in the zone is a negative smart zone, read-only smart zone, read-write smart zone, etc.

One of the benefits of utilizing conventional SAN zoning technology for implementing the various automated interoperability enforcement mechanisms of the present invention is that such implementations are able to leverage the use of existing zone distribution mechanisms to automatically propagate smart zoning interoperability enforcement mechanisms across the FC fabric. Such a technique also enhances the utility of zoning. According to at least one embodiment, the technique of the present invention may also be used to implement automated smart zoning interoperability enforcement mechanisms on a per-VSAN basis.

Returning to the example of FIG. 3, if it is assumed that the pair of SAN devices selected for analysis are the Solaris Server (WWN1) and HP Disk (WWN4), the Interoperability Matrix Table information relating to this selected pair of SAN devices indicates that the devices are incompatible. Thus, in at least one implementation, the smart zone type which may be selected and configured for this specific pair of SAN devices is the negative smart zone. Accordingly, a negative smart zone entry (e.g., 701, FIG. 7) which includes the members {WWN1, WWN4} (corresponding to the Solaris Server (WWN1) and HP Disk (WWN4)) may be automatically added to the Zone Attribute Table 700. As described in greater detail below, the negative smart zone entry 701 may be used to enforce the prohibition of communication between the two non-interoperable devices WWN1 and WWN4.

According to at least one implementation, the switch or other device implementing the Smart Zone Management Procedure of FIG. 3 may also be configured or designed to analyze the Zone Attribute Table information in order to aggregate or consolidate multiple smart zone entries into a single entry or fewer multiple entries. For example, referring to the Interoperability Matrix Table example of FIG. 6, one implementation of the present invention may enable the creation of two different negative smart zone entries in the Zone Attribute Table corresponding to the device pairs {WWN3, WWN2} and {WWN3, WWN6}. That is, a first negative smart zone entry may be created in the Zone Attribute Table which includes the members {WWN3, WWN2}, and a second negative smart zone entry may be created in the Zone Attribute Table which includes the members {WWN3, WWN6}. However, in at least one embodiment, these two negative smart zone entries may be consolidated into a single negative smart zone entry which includes the members {WWN2, WWN3, WWN6}, as shown, for example, at 703 of FIG. 7.

According to a specific embodiment, if there is insufficient information about a device selected for analysis (e.g., insufficient FDMI information and/or insufficient interoperability information), that device will not be listed as a member in any restrictive or prohibitive type smart zones (such as, for example, negative smart-zones). Additionally, if desired the customer or administrator may examine the smart zone entries in current active-zone set to see, for example, which devices are not allowed to talk to each other.

At 312 a determination is made as to whether there are additional pairs of SAN devices for which the smart zone analysis has not been performed. If it is determined that there are additional SAN devices to be analyzed, a next pair of devices may be selected (304) for smart zone analysis.

In an alternate implementation of the Smart Zone Management Procedure, rather than selecting a specific pair of SAN devices for smart zone analysis, a single SAN device is selected for smart zone analysis, and the Interoperability Matrix information and FDMI information is then used to identify all devices which are not interoperable with the selected SAN device. Assuming at least one non-interoperable device is identified, a negative smart zone entry may be automatically added to the Zone Attribute Table and populated with members corresponding to the selected SAN device and one or more of the identified non-interoperable device(s). Thus, for example, if the Server WWN3 is selected for smart zone analysis, disk devices WWN2 and WWN6 may be identified as being non-interoperable with Server WWN3. Accordingly, as shown, for example in FIG. 7, a negative smart zone entry 703 may be added to the Zone Attribute Table 700 which includes the members {WWN2, WWN3, WWN6}.

According to at least one embodiment, the smart zone information generated from the Smart Zone Management Procedure may be distributed (314) to other switches in the fabric and used to update information stored in the local Zone Attribute Tables maintained at each switch. According to a specific embodiment, the smart zone information may be distributed using conventional zoning distribution mechanisms such as those described previously.

According to different embodiments of the present invention, a variety of different techniques may be used for implementing SAN device interoperability enforcement. For example, in some implementations, different types of frame-based interoperability enforcement procedures may be implemented using at least a portion of the smart zoning information described previously. In other implementations, different types of lookup-based interoperability enforcement procedures may be utilized. Examples of at least some of these different techniques are illustrated in FIGS. 4 and 5 of the drawings.

Figure 4A:
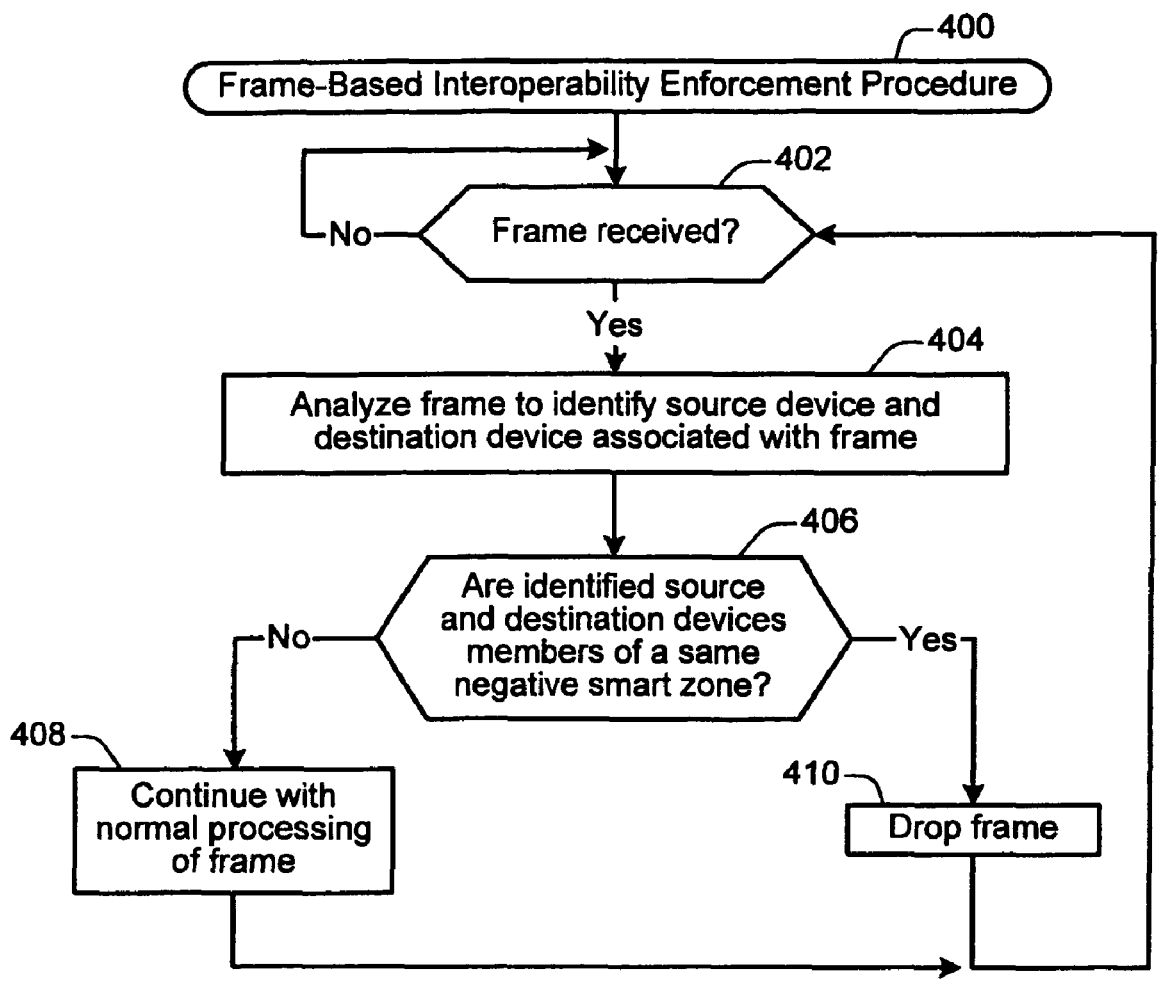
FIGS. 4A and 4B illustrate flow diagrams of different embodiments of Frame-Based Interoperability Enforcement Procedures which may be used for implementing various aspects of the present invention.
Figure 4B:
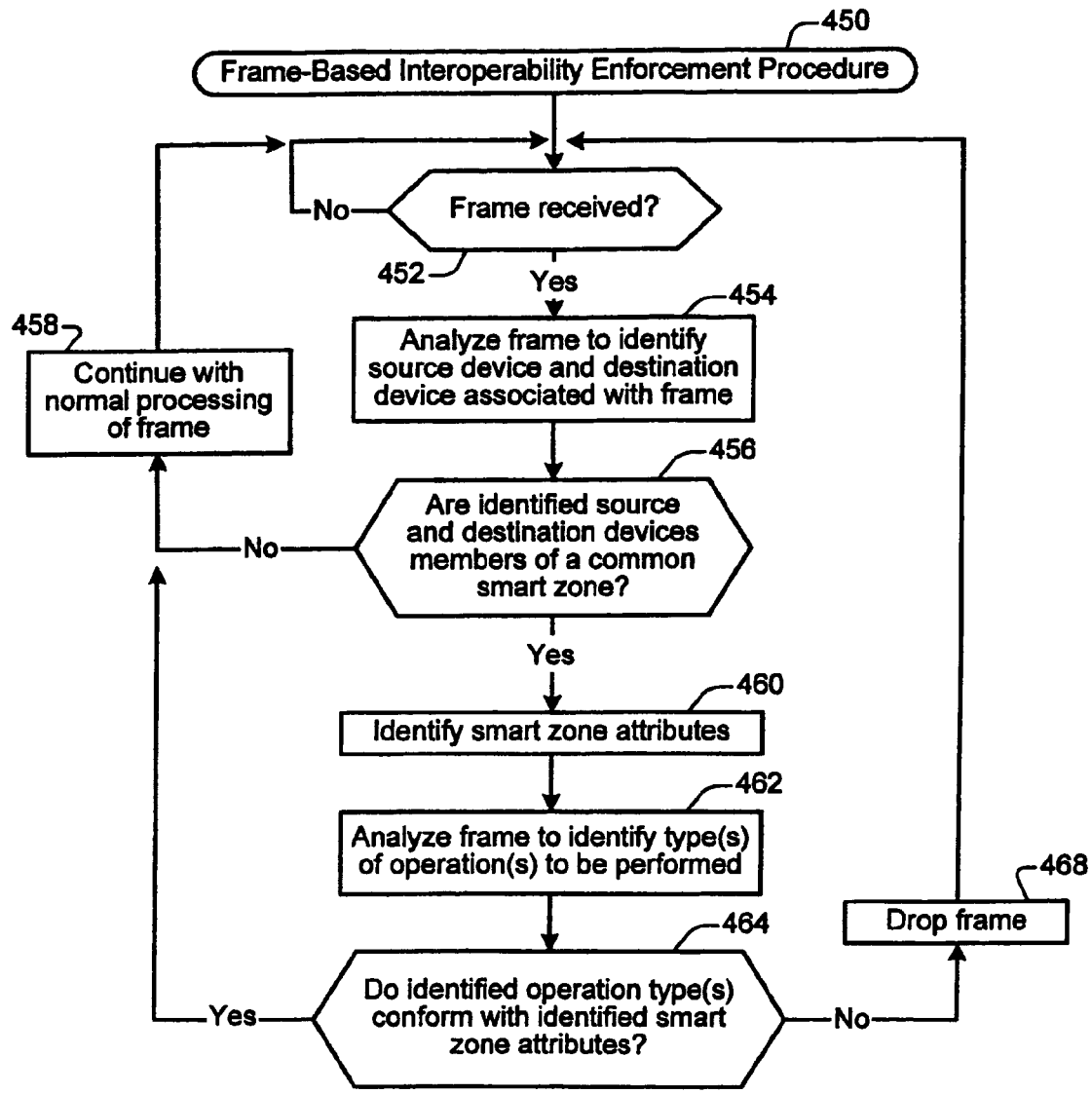
Figure 5:
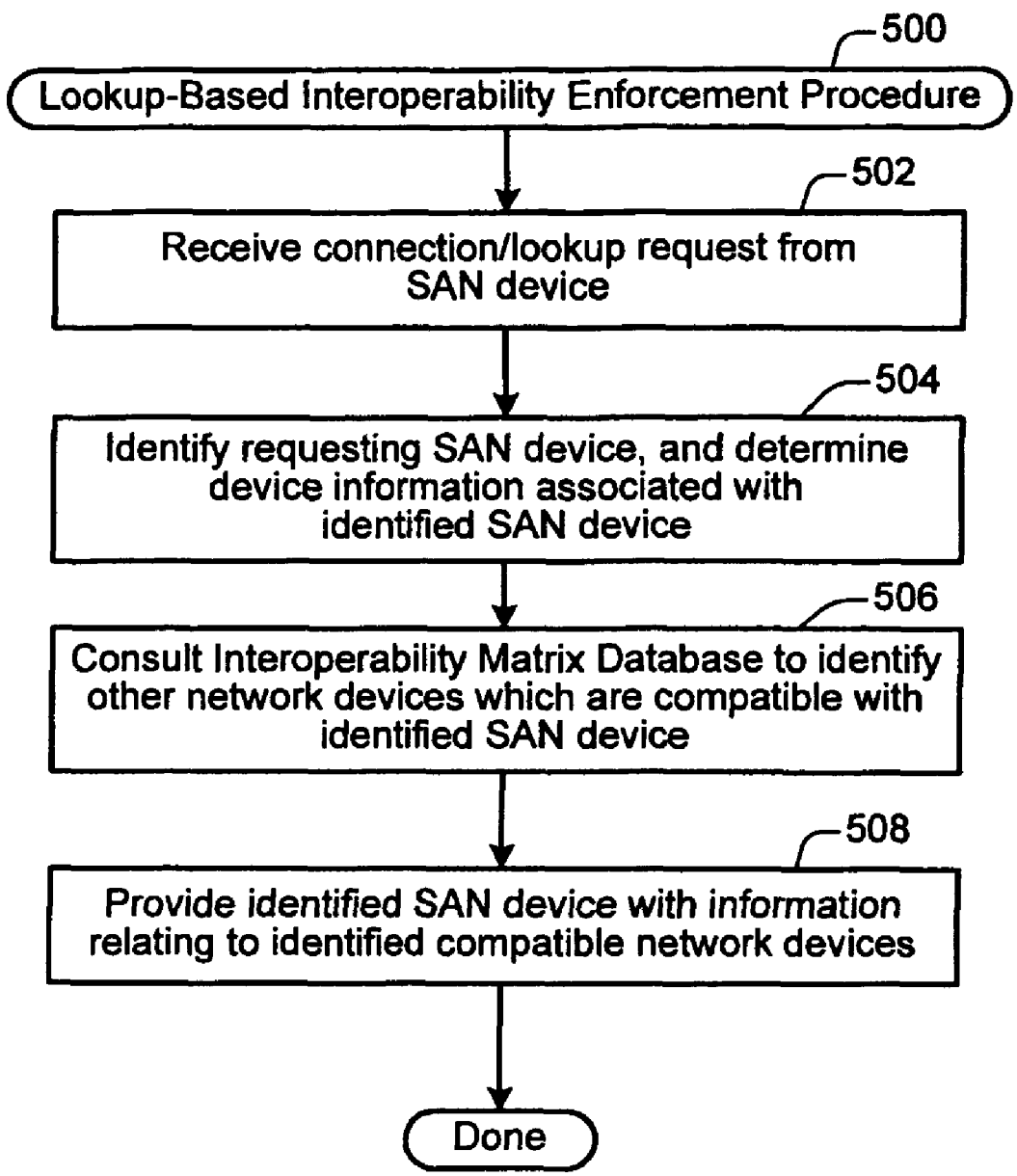
FIG. 5 shows a flow diagram of an example of a Lookup-Based Interoperability Enforcement Procedure 500 in accordance with a specific embodiment of the present invention.

FIGS. 4A and 4B illustrate flow diagrams of different embodiments of Frame-Based Interoperability Enforcement Procedures which may be used for implementing various aspects of the present invention. More specifically, the Frame-Based Interoperability Enforcement Procedure 400 of FIG. 4A provides an example of how negative smart zone information may be used for implementing interoperability enforcement, whereas the Frame-Based Interoperability Enforcement Procedure 450 of FIG. 4B provides an example of how other types of smart zone information may be used for implementing interoperability enforcement.

Referring first to FIG. 4A, an example of one embodiment of a Frame-Based Interoperability Enforcement Procedure 400 is shown. According to at least one implementation, one or more instances of the Frame-Based Interoperability Enforcement Procedure may be implemented at each switch or selected switches within a SAN. When a frame is received (402), the frame is analyzed (402) or classified in order to identify the source/destination information associated with that frame. In at least one implementation, this analysis may occur during a classification phase of the traffic handling operations performed at the switch. In at least one embodiment, the source/destination information may correspond to the SID, DID, WWN-ID and/or other node-ID information contained within the frame header. In a specific embodiment, the received frame may be classified in order to identify its associated flow.

As shown at 406, the identified source/destination information of the received frame may then be used to determine whether the identified source and destination devices are members of a same or common negative smart zone. According to at least one embodiment, such a determination may be made using, for example, information stored one or more local (and/or remote) Zone Attribute Table(s). If it is determined that the identified source and destination devices are members of a same or common negative smart zone, the frame may be dropped (410). However, if it is determined that the identified source and destination devices are no members of a same or common negative smart zone, then the received frame may be processed (408) normally. Thus, for example, referring to the Zone Attribute Table 700 of FIG. 7, if it is assumed that a switch receives a frame specifying a source device corresponding to WWN3 and a destination device corresponding to WWN6, the switch may determine that the identified source and destination devices a members of the same negative smart zone, namely smart zone B 703. Accordingly the switch may respond by dropping the received frame, thereby performing automatic interoperability enforcement by prohibiting communication between two non-interoperable devices.

Referring next first to FIG. 4B, an example of another embodiment of a Frame-Based Interoperability Enforcement Procedure 450 is shown. According to at least one implementation, one or more instances of the Frame-Based Interoperability Enforcement Procedure may be implemented at each switch or selected switches within a SAN. When a frame is received (452), the frame is analyzed (452) or classified in order to identify the source/destination information associated with that frame. As shown at 456, the identified source/destination information of the received frame may then be used to determine whether the identified source and destination devices are members of a same or common smart zone. According to at least one embodiment, such a determination may be made using, for example, information stored one or more local (and/or remote) Zone Attribute Table(s). If it is determined that the identified source and destination devices are not members of a same or common negative smart zone, then the received frame may be processed (458) normally. However, if it is determined that the identified source and destination devices are members of a same or common smart zone, the attributes of the identified common smart zone may be identified (460), and the frame may be further analyzed to determine (462) the type of operation(s) to be performed (e.g., read request, write request, read-write request, etc). Thereafter it may be determined (464) whether the identified operation(s) of the received frame conform with the interoperability restrictions specified by the identified smart zone attributes. If it is determined that the identified operation(s) of the received frame conform with the interoperability restrictions specified by the identified smart zone attributes, the received frame may be processed (458) normally. However, If it is determined that the identified operation(s) of the received frame conform with the interoperability restrictions specified by the identified smart zone attributes, the received frame may be dropped (468).

Thus, for example, referring to the Zone Attribute Table 700 of FIG. 7, if it is assumed that a switch receives a frame specifying a source device corresponding to WWN5 and a destination device corresponding to WWN4, the switch may determine that the identified source and destination devices a members of the same smart zone, namely read-only smart zone C 705. Accordingly the switch may further analyze or process the received frame in order to determine the type of operation(s) requested to be performed. If, for example, it is determined that the received frame includes one or more read requests, but no write requests, the switch may determine that the received frame information conforms with the read-only restrictions specified by the read-only smart zone attributes. Accordingly, the switch may continue with normal processing of the received frame. If, however, it is determined that the received frame includes one or more write requests, the switch may determine that the received frame information does not conform with the read-only restrictions specified by the read-only smart zone attributes. Accordingly, the switch may respond by dropping the received frame.

It will be appreciated that one of the advantages of the Frame-Based Interoperability Enforcement Procedure embodiment of FIG. 4A is that it provides a mechanism for enforcing SAN device interoperability restrictions without requiring any knowledge or information about the type of operation(s) being requested by each of the received frames.

In addition to frame-based interoperability enforcement procedures, other embodiments of the present invention may use different types of lookup-based interoperability enforcement procedures for enforcing SAN device interoperability restrictions.

FIG. 5 shows a flow diagram of an example of a Lookup-Based Interoperability Enforcement Procedure 500 in accordance with a specific embodiment of the present invention. According to at least one implementation, one or more instances of the Lookup-Based Interoperability Enforcement Procedure may be implemented at all or selected switches within a SAN such as, for example, all edge switches.

In the example of FIG. 5, it is assumed at 502 that a SAN device has submitted a connection request or a lookup request to a switch in order to ascertain information about other devices connected to the SAN. This may occur, for example, when a new SAN device joins the SAN network which, for example, may take place during the initialization stage of the SAN, or at some point after the SAN has been initialized. Upon receiving (502) a connection request or a lookup request from the SAN device, the identity of the requesting device is determined and used to retrieve or determine (504) device information associated with the identified SAN device. In one implementation, the device-related information may be determined using information stored in a local and/or remote FDMI database, as described previously.

Using the device-related information, an Interoperability Matrix database (such as, for example the Interoperability Matrix Table 600 of FIG. 6) may be consulted (506) in order to identify other network devices which are compatible with or interoperable with the identified SAN device. Alternatively and/or additionally, available Smart zone information may be used to identify other network devices which are compatible with or interoperable with the identified SAN device. The switch may then respond to the connection/lookup request by providing to the requesting device information relating to other SAN devices which have been identified as being compatible or interoperable with the requesting SAN device. Thus, in at least one implementation, the requesting SAN device will not be provided with information relating to non-compatible or non-interoperable SAN devices currently connected to the SAN. As a result, the requesting SAN device will thereafter communicate only with compatible or interoperable devices in the SAN. In this way, a lookup-based interoperability enforcement mechanism may be used for enforcing SAN device interoperability restrictions.

For example, referring to the Interoperability Matrix Table 600 of FIG. 6, if it is assumed that a switch has received a lookup request from Server WWN3, the switch may use the Interoperability Matrix information in the Interoperability Matrix Table 600 to determine devices which are compatible with or interoperable with Server WWN3. In this particular example, the only device shown to be compatible with Server WWN3 is Disk WWN4. Accordingly, the response to the lookup request will include information relating to Disk WWN4, but will not include information relating to Disk WWN2 nor Disk WWN6. However, as stated previously, the interoperability information included in the Interoperability Matrix Table 600 of FIG. 6 is merely illustrative of some of the different types of information which may be included in such a table. Different embodiments of the Interoperability Matrix Table (not shown) may include additional and/or other interoperability information not illustrated in FIG. 6. For example, in at least one implementation, an Interoperability Matrix data structure may be implemented as a multi-dimensional (e.g., 2-dimensional, 3-dimensional, 4-dimensional, etc.) data structure for relating interoperability information between multiple types of SAN devices such as, for example: hosts, servers, switches, storage devices, host bus adapters (HBAs), etc.

It will be appreciated that the SAN device interoperability enforcement technique of the present invention provides a number of benefits and advantages not provided by conventional interoperability enforcement techniques. For example, one benefit provided by the technique of the present invention is the ability to enable a SAN to automatically and dynamically enforce interoperability requirements between devices connected to the SAN. Additionally, using the technique of the present invention, interoperability enforcement may be achieved without requiring customers and/or administrators to manually plan and implement zoning/VSAN configurations in order to ensure interoperability requirements. Further, using the technique of the present invention, customers/administrators are not required to manually aggregate interoperability matrix information from one or more sources in order to setup their SAN. For example, at least one embodiment of the present invention enables interoperability matrix data to be automatically loaded from one or more sources to one or more switches, and further enables switch software to utilize the interoperability matrix data to perform automated enforcement of SAN device interoperability requirements. Such features may be used, for example, as secondary or backup mechanism for reducing or eliminating errors in a SAN design caused by human error (such as, for example, errors in SAN design caused by administrators who are attempting to manually plan and implement zoning/VSAN configurations in order to ensure interoperability requirements).

Figure 8:
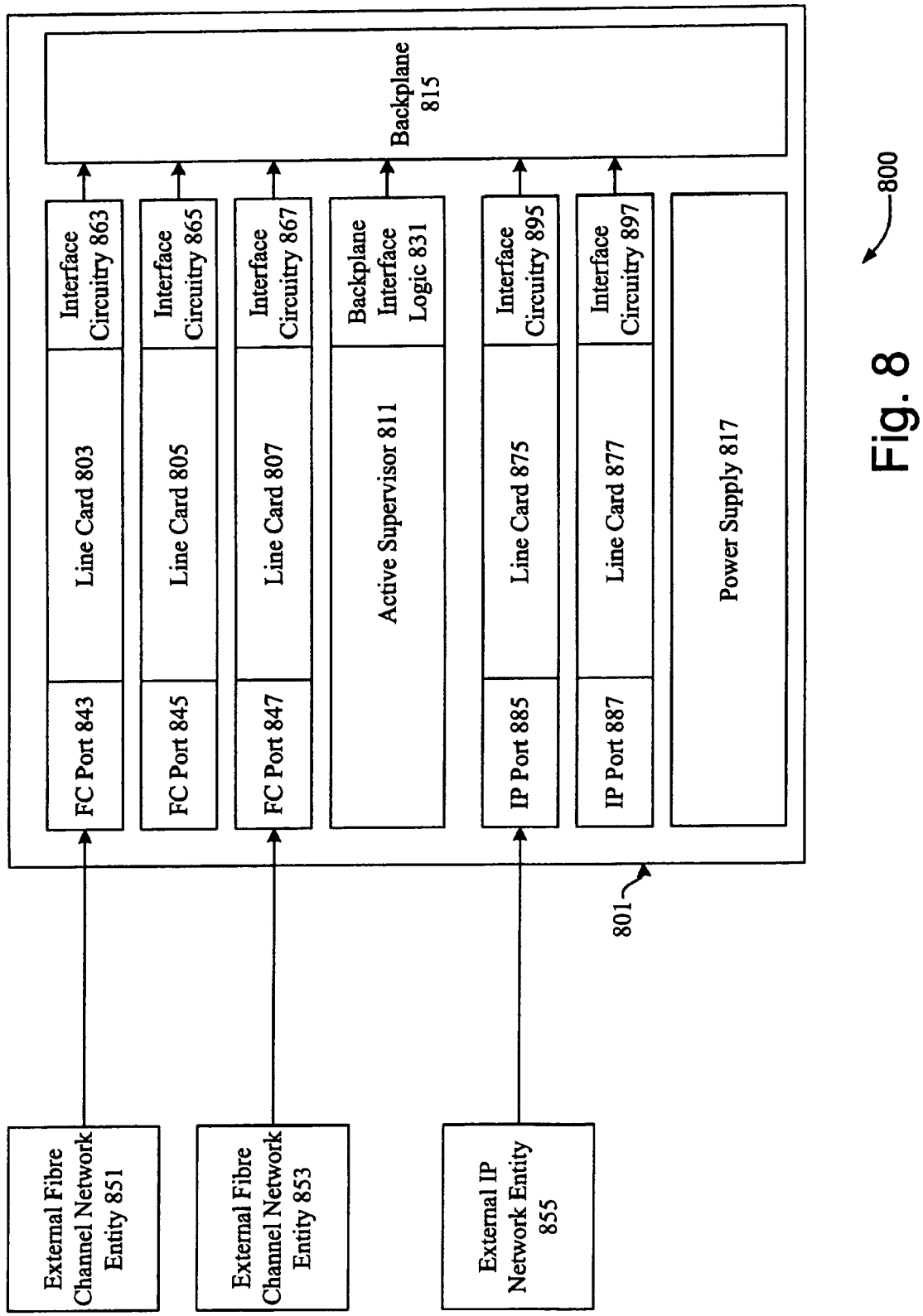
FIG. 8 is a diagrammatic representation of one example of a fibre channel switch that can be used to implement techniques of the present invention.

FIG. 8 is a diagrammatic representation of one example of a fibre channel switch that can be used to implement techniques of the present invention. Although one particular configuration will be described, it should be noted that a wide variety of switch and router configurations are available. The switch 801 may include one or more supervisors 811 and power supply 817. According to various embodiments, the supervisor 811 has its own processor, memory, and storage resources.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

Figure 9A:
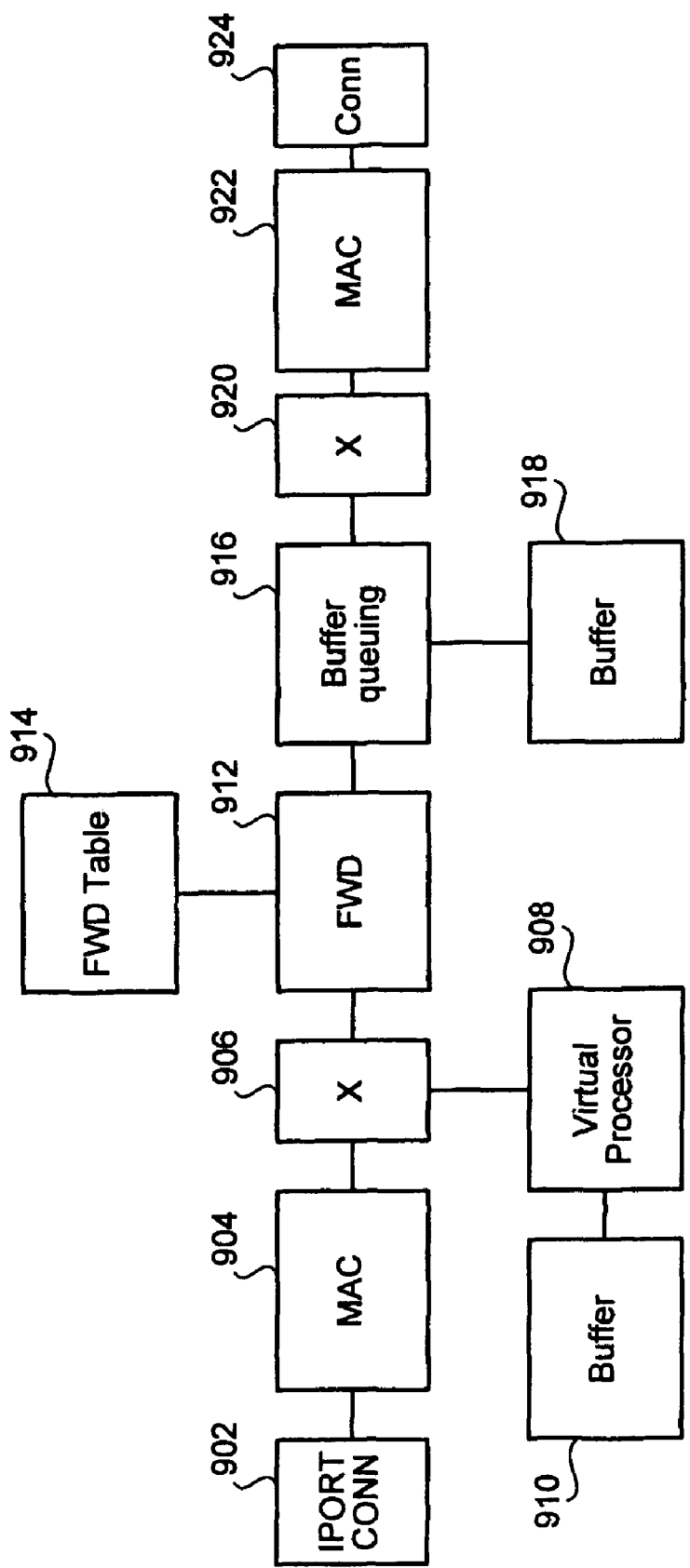
FIGS. 9A-C are block diagrams illustrating exemplary switches or portions thereof in which various embodiments of the present invention may be implemented.
Figure 9B:
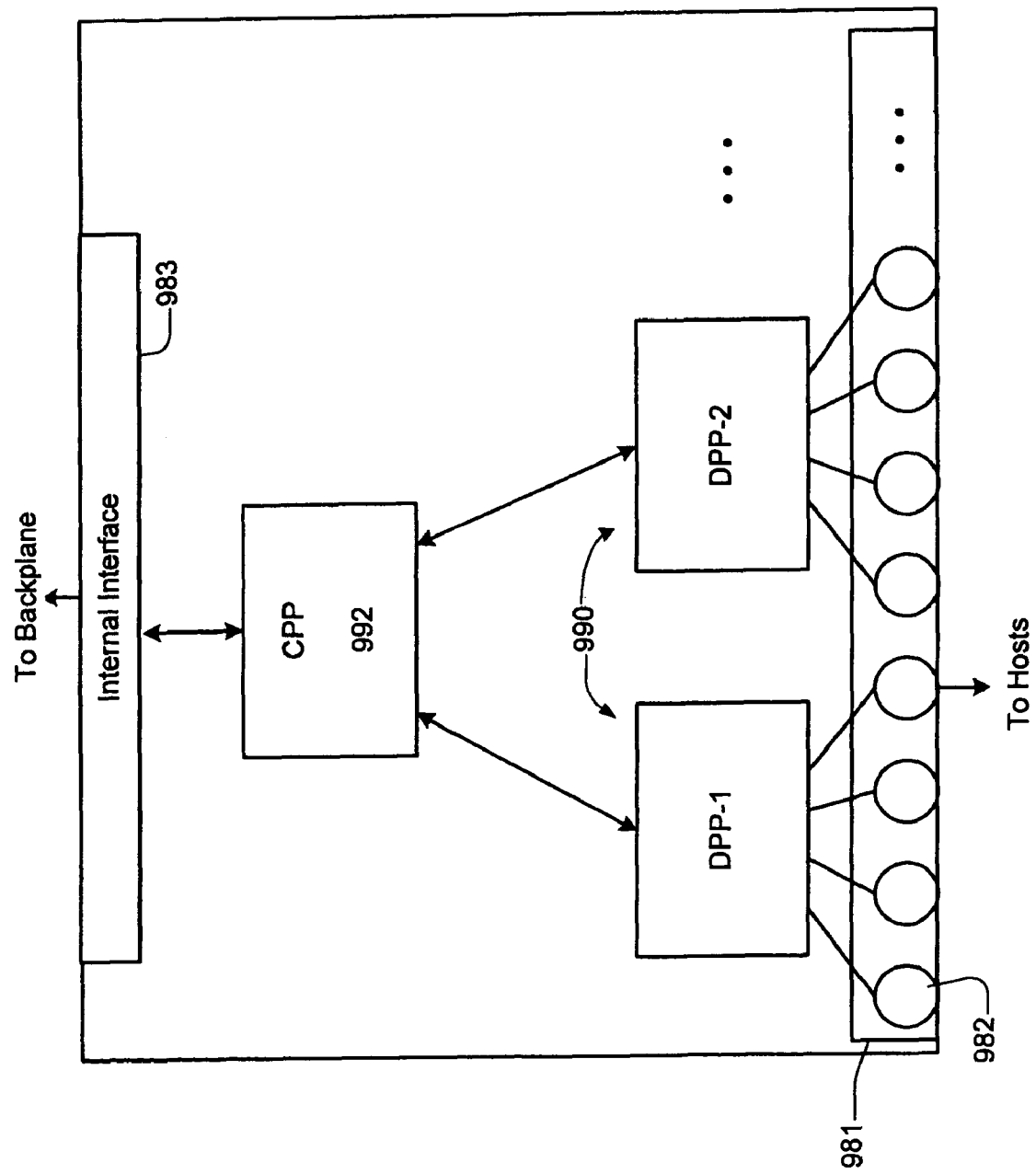
Figure 9C:
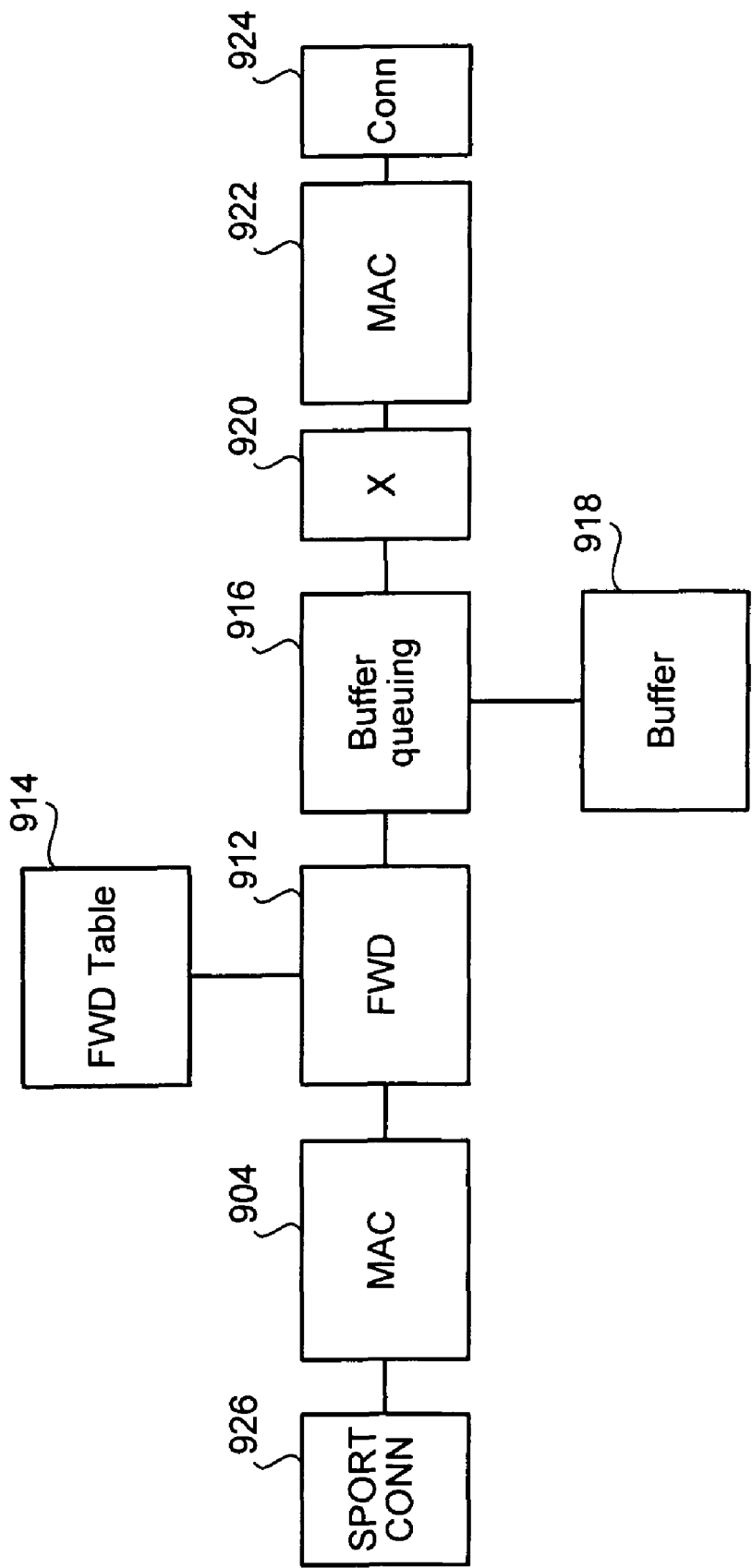

FIGS. 9A-C are block diagrams illustrating exemplary switches or portions thereof in which various embodiments of the present invention may be implemented.

FIG. 9A is a block diagram illustrating an exemplary virtualization switch in which various embodiments of the present invention may be implemented. As shown, data or messages are received by an intelligent, virtualization port (also referred to as an iPort) via a bi-directional connector 902. In addition, the virtualization port is adapted for handling messages on behalf of a virtual enclosure port, as will be described in further detail below. In association with the incoming port, Media Access Control (MAC) block 904 is provided, which enables frames of various protocols such as Ethernet or fibre channel to be received. In addition, a virtualization intercept switch 906 determines whether an address specified in an incoming frame pertains to access of a virtual storage location of a virtual storage unit representing one or more physical storage locations on one or more physical storage units of the storage area network. For instance, the virtual storage unit may be a virtual storage unit (e.g., VLUN) that is enclosed within a virtual enclosure.

When the virtualization intercept switch 906 determines that the address specified in an incoming frame pertains to access of a virtual storage location rather than a physical storage location, the frame is processed by a virtualization processor 908 capable of performing a mapping function such as that described above. More particularly, the virtualization processor 908 obtains a virtual-physical mapping between the one or more physical storage locations and the virtual storage location. In this manner, the virtualization processor 908 may look up either a physical or virtual address, as appropriate. For instance, it may be necessary to perform a mapping from a physical address to a virtual address or, alternatively, from a virtual address to one or more physical addresses.

Once the virtual-physical mapping is obtained, the virtualization processor 908 may then employ the obtained mapping to either generate a new frame or modify the existing frame, thereby enabling the frame to be sent to an initiator or a target specified by the virtual-physical mapping. The mapping function may also specify that the frame needs to be replicated multiple times, such as in the case of a mirrored write. More particularly, the source address and/or destination addresses are modified as appropriate. For instance, for data from the target, the virtualization processor replaces the source address, which was originally the physical LUN address with the corresponding virtual LUN and address. In the destination address, the port replaces its own address with that of the initiator. For data from the initiator, the port changes the source address from the initiator's address to the port's own address. It also changes the destination address from the virtual LUN/address to the corresponding physical LUN/address. The new or modified frame may then be provided to the virtualization intercept switch 906 to enable the frame to be sent to its intended destination.

While the virtualization processor 908 obtains and applies the virtual-physical mapping, the frame or associated data may be stored in a temporary memory location (e.g., buffer) 910. In addition, it may be necessary or desirable to store data that is being transmitted or received until it has been confirmed that the desired read or write operation has been successfully completed. As one example, it may be desirable to write a large amount of data to a virtual LUN, which must be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes necessary to verify the integrity of the data that has been sent to an initiator (or target).

The new or modified frame is then received by a forwarding engine 912, which obtains information from various fields of the frame, such as source address and destination address. The forwarding engine 912 then accesses a forwarding table 914 to determine whether the source address has access to the specified destination address. More specifically, the forwarding table 914 may include physical LUN addresses as well as virtual LUN addresses. The forwarding engine 912 also determines the appropriate port of the switch via which to send the frame, and generates an appropriate routing tag for the frame.

Once the frame is appropriately formatted for transmission, the frame will be received by a buffer queuing block 916 prior to transmission. Rather than transmitting frames as they are received, it may be desirable to temporarily store the frame in a buffer or queue 918. For instance, it may be desirable to temporarily store a packet based upon Quality of Service in one of a set of queues that each correspond to different priority levels. The frame is then transmitted via switch fabric 920 to the appropriate port. As shown, the outgoing port has its own MAC block 922 and bi-directional connector 924 via which the frame may be transmitted.

FIG. 9B is a block diagram illustrating a portion of an exemplary virtualization switch or intelligent line card in which various embodiments of the present invention may be implemented. According to a specific embodiment, switch portion 980 of FIG. 9B may be implemented as one of a plurality of line cards residing in a fibre channel switch such as that illustrated in FIG. 8, for example. In at least one implementation, switch portion 980 may include a plurality of different components such as, for example, at least one external interface 981, at least one data path processor (DPP) 990, at least one control path processor (CPP) 992, at least one internal interface 983, etc.

As shown in the example of FIG. 9B the external interface of 981 may include a plurality of ports 982 configured or designed to communicate with external devices such as, for example, host/server devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 982 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 9B, switch portion 980 may also include a control path processor (CPP) 992 configured or designed to perform control path processing for storage virtualization. In at least one implementation, functions performed by the control path processor may include, for example, calculating or generating virtual-to-physical (V2P) mappings, processing of port login and process login for volumes; hosting iPort VM clients which communicate with volume management (VM) server(s) to get information about the volumes; communicating with name server(s); etc.

As described above, all switches in a storage area network need not be virtualization switches. In other words, a switch may be a standard switch in which none of the ports implement "intelligent," virtualization functionality. FIG. 9C is a block diagram illustrating an exemplary standard switch in which various embodiments of the present invention may be implemented. As shown, a standard port 926 has a MAC block 904. However, a virtualization intercept switch and virtualization processor such as those illustrated in FIG. 9A are not implemented. A frame that is received at the incoming port is merely processed by the forwarding engine 912 and its associated forwarding table 914. Prior to transmission, a frame may be queued 916 in a buffer or queue 918. Frames are then forwarded via switch fabric 920 to an outgoing port. As shown, the outgoing port also has an associated MAC block 922 and bi-directional connector 924. Of course, each port may support a variety of protocols. For instance, the outgoing port may be an iSCSI port (i.e. a port that supports SCSI over IP over Ethernet), which also supports virtualization, as well as parallel SCSI and serial SCSI.

Although the network devices described above with reference to FIGS. 9A-C are described as switches, these network devices are merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed virtualization functionality. In at least one embodiment, a storage area network may be implemented with virtualization switches adapted for implementing virtualization functionality as well as standard switches. Each virtualization switch may include one or more "intelligent" virtualization ports as well as one or more standard ports. In order to support the virtual-physical mapping and accessibility of memory by multiple applications and/or hosts, it is desirable to coordinate memory accesses between the virtualization switches in the fabric. In one implementation, communication between switches may be accomplished by an inter-switch link.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for facilitating enforcement of device interoperability requirements in a storage area network (SAN), the storage area network including a fibre channel fabric comprising at least one switch, the method comprising:
    receiving a first frame, the first frame including header information including a source device identity relating to a source device and a destination device identity relating to a destination device;
    determining whether the source device and destination device are members of a first negative zone, wherein the first negative zone corresponds to a SAN-implemented zone having a first associated negative zone attribute prohibiting communication between members of the first negative zone, wherein the members of the first negative zone are non-interoperable;
    preventing the first frame from reaching the destination device in response to a determination that the source device and destination device are members of the first negative zone, wherein the first negative zone is a logical zone identifying devices that are not permitted to communicate with one another such that the members of the first negative zone are not permitted to communicate with one another; and
    wherein the method is implemented at the at least one switch.

2. The method of claim 1 further comprising:
    dropping the first frame in response to a determination that the source device and destination device are members of the first negative zone.

3. The method of claim 1 further comprising:
    analyzing a first portion of device interoperability information relating to the source device and destination device;
    determining, using the first portion of device interoperability information, that the source device and destination device are non-interoperable; and
    including the source device and the destination device as members of the first negative zone in response to the determination that the source device and destination device are non-interoperable.

4. The method of claim 1 further comprising:
    normally processing the first frame in response to a determination that the source device and destination device are not members of any common negative zone.

5. A method for facilitating enforcement of device interoperability requirements in a storage area network (SAN), the storage area network including a fibre channel fabric comprising at least one switch, the method comprising:
    receiving a first request from a first SAN device, the first request including a lookup request or connection request for identifying other devices connected to the SAN;
    accessing a first portion of device interoperability information relating to the first SAN device;
    identifying, using the first portion of device interoperability information, at least one non-interoperable device connected to the SAN which is not interoperable with the first SAN device, wherein the first portion of device interoperability information identifies a set of devices that are non-interoperable with the first SAN device, the set of devices being members of a first negative zone, the members of the first negative zone being non-interoperable;
    generating a first response to the first request, wherein the first response excludes information relating to an identity of the at least one non-interoperable device;
    sending the first response to the first SAN device, thereby preventing the first SAN device from communicating with any devices in the SAN which have been identified as being non-interoperable with the first SAN device; and
    wherein the method is implemented at the at least one switch.

6. The method of claim 5 further comprising:
    identifying, using the first portion of device interoperability information, at least one interoperable device connected to the SAN which is interoperable with the first SAN device; and
    generating the first response to the first request, wherein the first response further includes information relating to at least one identity of the at least one interoperable device.

7. The method of claim 5 further comprising:
    using information from the first response to prevent the first SAN device from communicating with any devices in the SAN which have been identified as being non-interoperable with the first SAN device.

8. The method of claim 5 further comprising:
identifying, using the first portion of device interoperability information, at least one interoperable device connected to the SAN which is interoperable with the first SAN device;
generating the first response to the first request, wherein the first response further includes information relating to at least one identity of the at least one interoperable device; and
using information from the first response to allow the first SAN device to communicate only with devices in the SAN which have been identified as being interoperable with the first SAN device.

9. A method for facilitating enforcement of device interoperability requirements in a storage area network (SAN), the storage area network including a fibre channel fabric comprising at least one switch, the method comprising:
analyzing a first portion of device interoperability information relating to the SAN;
automatically identifying, using the first portion of device interoperability information, a first device and second device of the SAN which are non-interoperable;
including the first device and the second device as members of a first negative zone after automatically identifying that the first device and the second device of the SAN are non-interoperable, wherein the first negative zone corresponds to a SAN-implemented logical zone having a first associated negative zone attribute prohibiting communication between members of the first negative zone such that the members of the first negative zone are not permitted to communicate with one another, wherein the members of the first negative zone are non-interoperable; and
wherein the method is implemented at the at least one switch.

10. The method of claim 9 further comprising:
defining the first negative zone to include the first associated negative zone attribute prohibiting communication between members of the first negative zone.

11. The method of claim 9 further comprising:
automatically generating the first portion of interoperability information using device interoperability information obtained from at least one source.

12. The method of claim 9 wherein the first portion of device interoperability information is stored in local memory, the method further comprising:
receiving updated interoperability information from at least one source; and
automatically updating the first portion of device interoperability information the received updated interoperability information.

13. The method of claim 9 further comprising:
automatically generating negative zone information which includes information relating to the first negative zone; and
using the negative zone information to enforce device interoperability requirements of the SAN.

14. The method of claim 9 further comprising:
automatically generating negative zone information which includes information relating to the first negative zone;
automatically distributing the negative zone information to other devices in the SAN; and
using the negative zone information to enforce device interoperability requirements of the SAN.

15. A system for facilitating enforcement of device interoperability requirements in a storage area network (SAN), the storage area network including a fibre channel fabric comprising at least one switch, the system comprising:
at least one processor;
at least one interface configured or designed to provide a communication link to at least one other network device in the SAN; and
memory;
the system being configured or designed to:
receive a first frame, the first frame including header information including a source device identity relating to a source device and a destination device identity relating to a destination device;
determine whether the source device and destination device are members of a first negative zone, wherein the first negative zone corresponds to a SAN-implemented logical zone having a first associated negative zone attribute prohibiting communication between members of the first negative zone such that the members of the first negative zone are not permitted to communicate with one another, wherein the members of the first negative zone are non-interoperable;
prevent the first frame from reaching the destination device in response to a determination that the source device and destination device are members of the first negative zone; and
wherein the system is implemented at the at least one switch.

16. The system of claim 15 being further configured or designed to:
drop the first frame in response to a determination that the source device and destination device are members of the first negative zone.

17. The system of claim 15 being further configured or designed to:
analyze a first portion of device interoperability information relating to the source device and destination device;
determine, using the first portion of device interoperability information, that the source device and destination device are non-interoperable; and
include the source device and the destination device as members of the first negative zone in response to the determination that the source device and destination device are non-interoperable.

18. The system of claim 15 being further configured or designed to:
normally process the first frame in response to a determination that the source device and destination device are not members of any common negative zone.

19. A system for facilitating enforcement of device interoperability requirements in a storage area network (SAN), the storage area network including a fibre channel fabric comprising at least one switch, the system comprising:
at least one processor;
at least one interface configured or designed to provide a communication link to at least one other network device in the SAN; and
memory;
the system being configured or designed to:
receive a first request from a first SAN device, the first request including a lookup request or connection request for identifying other devices connected to the SAN;
access a first portion of device interoperability information relating to the first SAN device, wherein the first portion of device interoperability information identifies a set of devices that are non-interoperable with the first SAN device, the set of devices being members of a first negative zone, the members of the first negative zone being non-interoperable;

identify, using the first portion of device interoperability information, at least one non-interoperable device connected to the SAN which is not interoperable with the first SAN device;

generate a first response to the first request, wherein the first response excludes information relating to an identity of the at least one non-interoperable device; and send the first response to the first SAN device, thereby preventing the first SAN device from communicating with any devices in the SAN which have been identified as being non-interoperable with the first SAN device.

20. The system of claim 19 being further configured or designed to:

identify, using the first portion of device interoperability information, at least one interoperable device connected to the SAN which is interoperable with the first SAN device; and generate the first response to the first request, wherein the first response further includes information relating to at least one identity of the at least one interoperable device.

21. The system of claim 19 being further configured or designed to:

use information from the first response to prevent the first SAN device from communicating with any devices in the SAN which have been identified as being non-interoperable with the first SAN device.

22. The system of claim 19 being further configured or designed to:

identify, using the first portion of device interoperability information, at least one interoperable device connected to the SAN which is interoperable with the first SAN device;

generate the first response to the first request, wherein the first response further includes information relating to at least one identity of the at least one interoperable device; and use information from the first response to allow the first SAN device to communicate only with devices in the SAN which have been identified as being interoperable with the first SAN device.

23. The system of claim 19 wherein the system is implemented at the at least one switch.

24. A system for facilitating enforcement of device interoperability requirements in a storage area network (SAN), the storage area network including a fibre channel fabric comprising at least one switch, the system comprising:

at least one processor;

at least one interface configured or designed to provide a communication link to at least one other network device in the SAN; and memory;

the system being configured or designed to:

analyze a first portion of device interoperability information relating to the SAN;

automatically identify, using the first portion of device interoperability information, a first device and second device of the SAN which are non-interoperable; and include the first device and the second device as members of a first negative zone after automatically identifying that the first device and the second device of the SAN are non-interoperable, wherein the first negative zone corresponds to a SAN-implemented logical zone having a first associated negative zone attribute prohibiting communication between members of the first negative zone such that the members of the first negative zone are not permitted to communicate with one another, wherein the members of the first negative zone are non-interoperable.

25. The system of claim 24 being configured or designed to:

define the first negative zone which includes the first associated negative zone attribute prohibiting communication between members of the first negative zone.

26. The system of claim 24 being further configured or designed to:

automatically generate the first portion of interoperability information using device interoperability information obtained from at least one source.

27. The system of claim 24 wherein the first portion of device interoperability information is stored in local memory, the system being further configured or designed to:

receive updated interoperability information from at least one source; and automatically update the first portion of device interoperability information the received updated interoperability information.

28. The system of claim 24 being further configured or designed to:

automatically generate negative zone information which includes information relating to the first negative zone; and use the negative zone information to enforce device interoperability requirements of the SAN.

29. The system of claim 24 being further configured or designed to:

automatically generate negative zone information which includes information relating to the first negative zone;

automatically distributing the negative zone information to other devices in the SAN; and use the negative zone information to enforce device interoperability requirements of the SAN.

30. The system of claim 24 wherein the system is implemented at the at least one switch.

31. A system for facilitating enforcement of device interoperability requirements in a storage area network (SAN), the storage area network including a fibre channel fabric comprising at least one switch, the system comprising:

at least one processor;

the system being configured or designed for:

receiving a first frame by the at least one switch, the first frame including header information including a source device identity relating to a source device and a destination device identity relating to a destination device;

determining by the at least one switch whether the source device and destination device are members of a first negative zone, wherein the first negative zone corresponds to a SAN-implemented logical zone having a first associated negative zone attribute prohibiting communication between members of the first negative zone such that the members of the first negative zone are not permitted to communicate with one another and wherein members of the first negative zone are non-interoperable; and preventing by the at least one switch the first frame from reaching the destination device in response to a determination that the source device and destination device are members of the first negative zone, wherein the members of the first negative zone are non-interoperable.

32. A system for facilitating enforcement of device interoperability requirements in a storage area network (SAN), the storage area network including a fibre channel fabric comprising at least one switch, the system comprising:
- at least one processor;
- the system being configured or designed for:
  - receiving by the at least one switch a first request from a first SAN device, the first request including a lookup request or connection request for identifying other devices connected to the SAN;
  - accessing by the at least one switch a first portion of device interoperability information relating to the first SAN device, wherein the first portion of device interoperability information identifies a set of devices that are non-interoperable with the first SAN device, the set of devices being members of a first negative zone, the members of the first negative zone being non-interoperable;
  - identifying by the at least one switch, using the first portion of device interoperability information, at least one non-interoperable device connected to the SAN which is not interoperable with the first SAN device;
  - generating by the at least one switch a first response to the first request, wherein the first response excludes information relating to an identity of the at least one non-interoperable device; and
  - sending the first response to the first SAN device, thereby preventing the first SAN device from communicating with any devices in the SAN which have been identified as being non-interoperable with the first SAN device.

33. A system for facilitating enforcement of device interoperability requirements in a storage area network (SAN), the storage area network including a fibre channel fabric comprising at least one switch, the system comprising:
- at least one processor;
- the system being configured or designed for:
  - analyzing by the at least one switch a first portion of device interoperability information relating to the SAN;
  - automatically identifying by the at least one switch, using the first portion of device interoperability information, a first device and second device of the SAN which are non-interoperable; and
  - including by the at least one switch the first device and the second device as members of a first negative zone after automatically identifying that the first device and the second device of the SAN are non-interoperable, wherein the first negative zone corresponds to a SAN-implemented logical zone having a first associated negative zone attribute prohibiting communication between members of the first negative zone such that the members of the first negative zone are not permitted to communicate with one another, wherein the members of the first negative zone are non-interoperable.

* * * * *